United States Patent
Collins

(10) Patent No.: US 7,493,151 B2
(45) Date of Patent: Feb. 17, 2009

(54) HOUSING ARRANGEMENT FOR A PORTABLE DEVICE WITH A DISPLAY

(75) Inventor: Christopher Todd Collins, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/374,687

(22) Filed: Mar. 14, 2006

(65) Prior Publication Data

US 2007/0217132 A1 Sep. 20, 2007

(51) Int. Cl.
*H04B 1/38* (2006.01)
(52) U.S. Cl. ............... 455/575.4; 361/681; 345/173
(58) Field of Classification Search ........... 361/681, 361/727; 455/575.4; 345/905, 173
See application file for complete search history.

(56) References Cited

U.S. PATENT DOCUMENTS

| | | | |
|---|---|---|---|
| 5,657,370 A * | 8/1997 | Tsugane et al. | ............ 455/566 |
| 6,009,338 A * | 12/1999 | Iwata et al. | ............ 455/575.4 |
| 6,665,173 B2 | 12/2003 | Brandenberg et al. | |
| 6,865,400 B2 * | 3/2005 | Oh et al. | ................. 455/556.2 |
| 6,980,840 B2 * | 12/2005 | Kim et al. | ............... 455/575.4 |
| 7,016,182 B2 | 3/2006 | Brandenberg et al. | |
| 7,107,018 B2 * | 9/2006 | Jellicoe | ..................... 455/90.3 |
| 2003/0064750 A1 | 4/2003 | Oh et al. | |
| 2003/0104850 A1 | 6/2003 | Lai et al. | |
| 2003/0156099 A1 * | 8/2003 | Yrjanainen et al. | ........ 345/173 |
| 2004/0229662 A1 | 11/2004 | Chadha | |
| 2004/0239753 A1 | 12/2004 | Proctor et al. | |
| 2005/0083642 A1 * | 4/2005 | Senpuku et al. | ............. 361/681 |
| 2005/0096082 A1 * | 5/2005 | Chang | ..................... 455/550.1 |
| 2005/0128686 A1 * | 6/2005 | Pihlaja et al. | ............... 361/679 |
| 2005/0154798 A1 * | 7/2005 | Nurmi | ............................ 710/1 |
| 2005/0275633 A1 * | 12/2005 | Varanda | ..................... 345/173 |
| 2006/0030381 A1 * | 2/2006 | Byun et al. | ............. 455/575.4 |

FOREIGN PATENT DOCUMENTS

| | | |
|---|---|---|
| EP | 1067747 | 1/2001 |
| WO | WO03021922 | 3/2003 |

OTHER PUBLICATIONS

Annex to Form PCT/ISA/206, International Application No. PCT/US2006/049535, Mailed: Jul. 12, 2007.

* cited by examiner

*Primary Examiner*—Lisa Lea-Edmonds
*Assistant Examiner*—Ingrid Wright
(74) *Attorney, Agent, or Firm*—Coats & Bennett, P.L.L.C.

(57) ABSTRACT

A housing arrangement for a mobile communication device comprises first and second housing sections connected together and movable relative to one another between open and closed positions. The first housing section includes a display that is substantially concealed by the second housing section in a closed configuration. The second housing section includes a window that reveals a portion of the display in the closed configuration. In the open configuration, a touch sensitive input is accessible through the window in the second housing section.

13 Claims, 4 Drawing Sheets

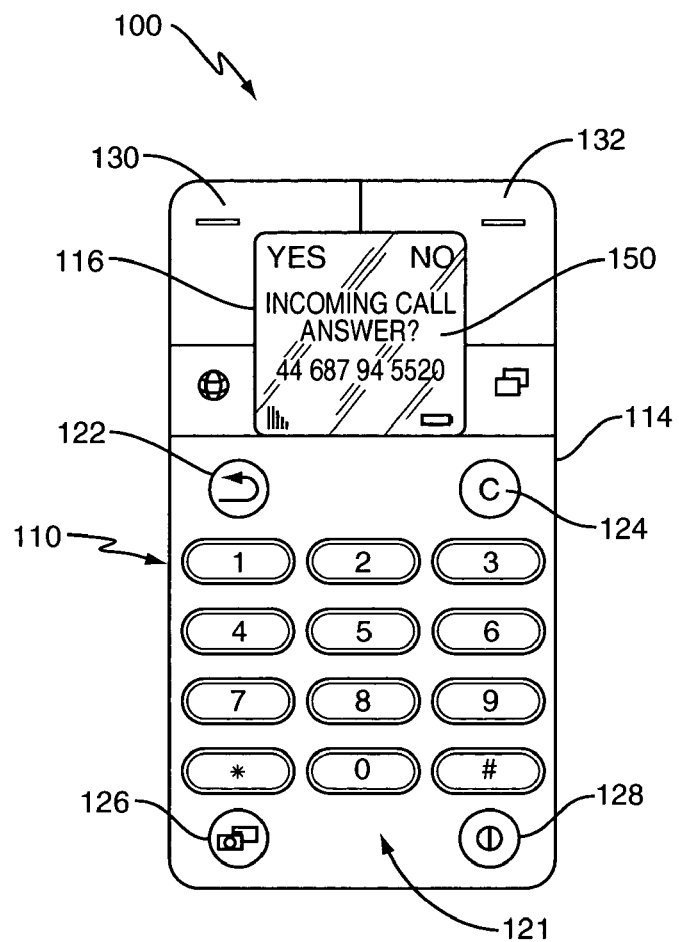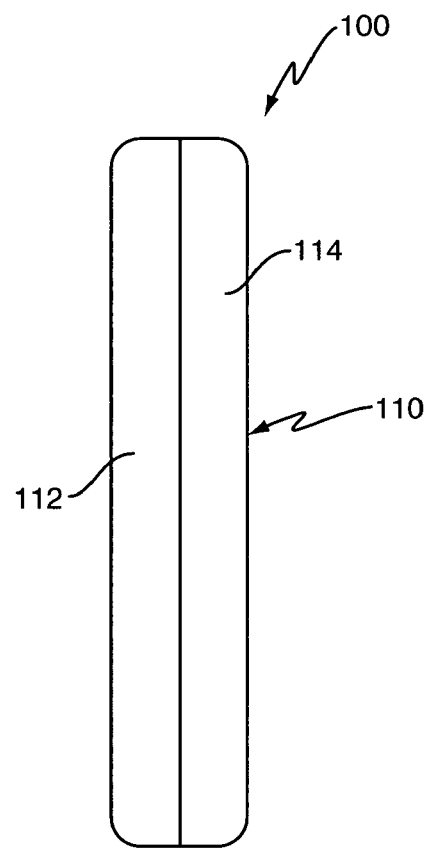
FIG. 1  FIG. 2

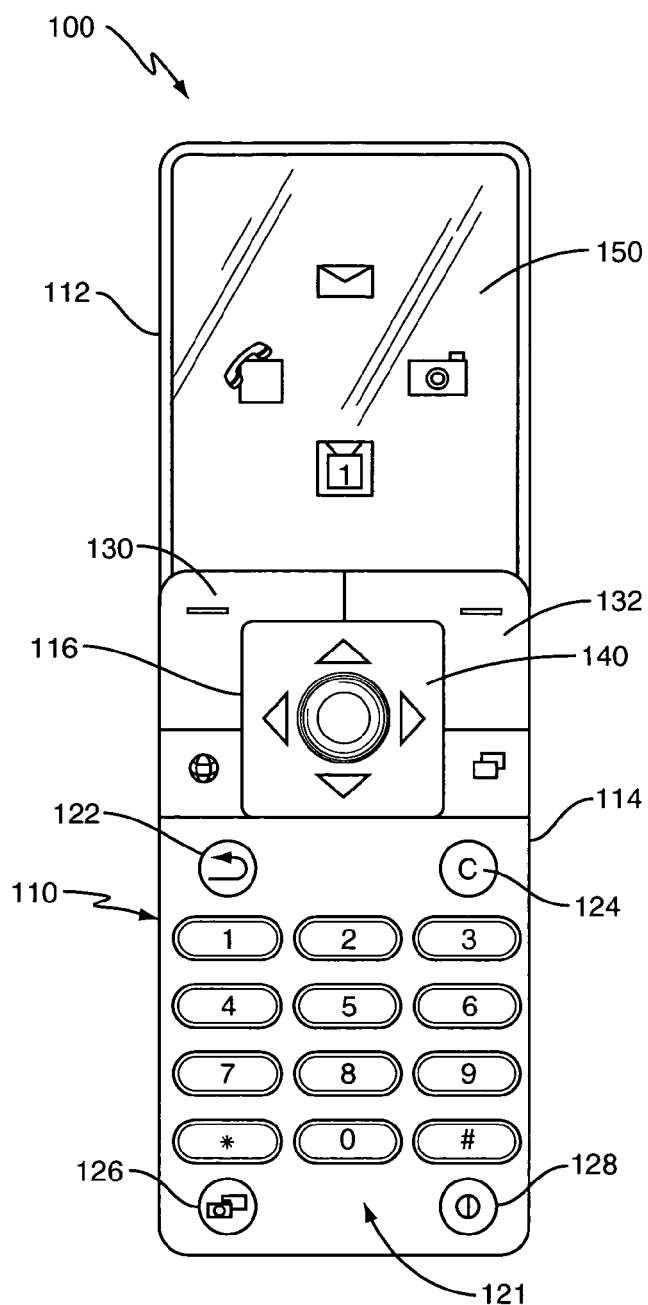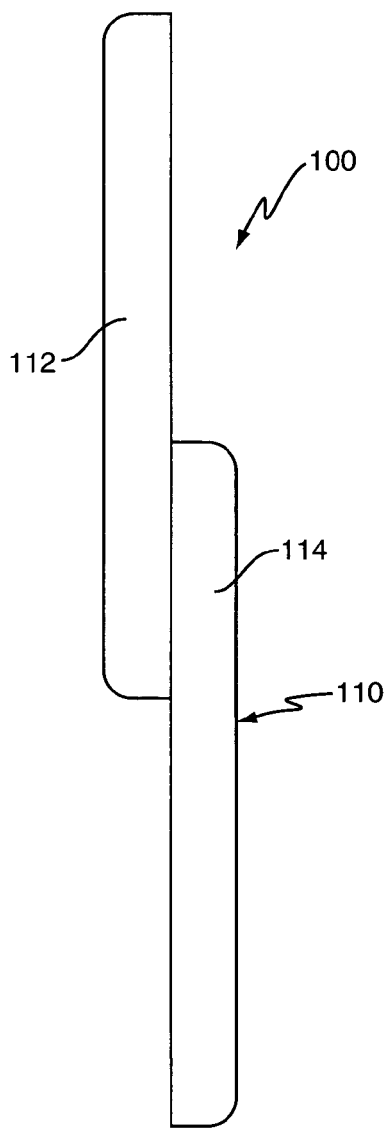
*FIG. 3*  *FIG. 4*

HOUSING ARRANGEMENT FOR A PORTABLE DEVICE WITH A DISPLAY

BACKGROUND OF THE INVENTION

The present invention relates generally to handheld and portable electronic devices and, more particularly, to housing and user interface design for handheld and portable electronic devices.

Handheld and portable electronic devices have become a ubiquitous accoutrement for consumers in modern society. Such devices include mobile phones, personal digital assistants, cameras, and audio players. Because it is inconvenient to carry numerous devices to perform different functions, consumers desire multi-function devices that can perform a variety of functions. This trend has led to a convergence of wireless communication and computing technologies in a single device. Such devices may also include a camera and audio recording/playback capabilities.

Many mobile devices have multi-part housings with two or more sections that pivot, rotate or slide relative to one another. For example, clamshell-type mobile phones (also known as a flip phones) typically comprise two housing section pivotally connected by a hinge. One section serves as a cover or flip and moves between open and closed positions to cover the display and/or keypad of the phone on the other section. Sliding designs (referred to herein as sliders) are known in which two or more housing sections slide relative to one another. There are also jack-knife designs where two or more sections rotate relative to one another like a jack knife.

There are advantages and disadvantages for each different design type. Clamshell designs can accommodate large displays that are protected when the cover is closed. A smaller display may be provided on the cover section to allow viewing of information, such as caller identification, current time and date, and battery power, when the cover is closed. In most clamshell designs, the keypad is also covered in the closed position to prevent accidental dialing and key presses When open, the clamshell designs are a "natural" size for most ear to mouth distances. However, clamshell designs are prone to breaking and mechanical failures, have limited functions in the closed configuration, and have less than ideal distances between soft keys and the display. In sliding designs, the display is typically on the outside and supports functions in the closed configuration. Keypads are usually covered in the closed configuration and are protected against inadvertent key presses. Sliding designs tend to be more robust than clamshell designs and provide the same size advantage in terms of ear to mouth distances. However, sliding designs do not provide protection for the display and do not typically include a secondary display to view information.

SUMMARY OF THE INVENTION

A portable electronic device according to one exemplary embodiment comprises a first housing section and a second housing section connected to the first housing section so as to be movable relative to one another between open and closed positions. A display is disposed on the first housing section and arranged to be substantially concealed by the second housing section when the first and second housing sections are in the closed configuration. A window in the second housing section allows a portion of the display to be viewed through said window when the first and second housing sections are in the closed configuration.

In some embodiments of the invention, a touch sensitive input device is disposed on the first housing section and is accessible through the window in the second housing section when the first and second housing sections are in the open configuration. The display may comprise a touch screen display. A portion of the touch-screen display may be accessible through the window in the second housing section and function as the touch sensitive input. Alternatively, the touch sensitive input device may comprise a touch pad or other input device that is wholly separate from the display.

In some embodiments of the invention, the second housing section may further include one or more soft keys for receiving user input. The soft keys may be disposed adjacent the window. Soft key icons indicating the function of the soft keys may be displayed on the portion of the display visible through the window in the second housing section.

BRIEF DESCRIPTION OF THE DRAWINGS

FIG. 1 is a front view of a mobile communication device in a closed configuration. A display on a first housing section is visible through a window in a second housing section.

FIG. 2 is a side view of the mobile communication device in a closed configuration.

FIG. 3 is a front view of a first exemplary embodiment of the mobile communication device in an open configuration. In this embodiment, a portion of a touch screen display is accessible through the window in the second housing section and serves as a touch-sensitive input device.

FIG. 4 is a side view of the mobile communication device in an open configuration.

DETAILED DESCRIPTION OF THE INVENTION

Figure 5:
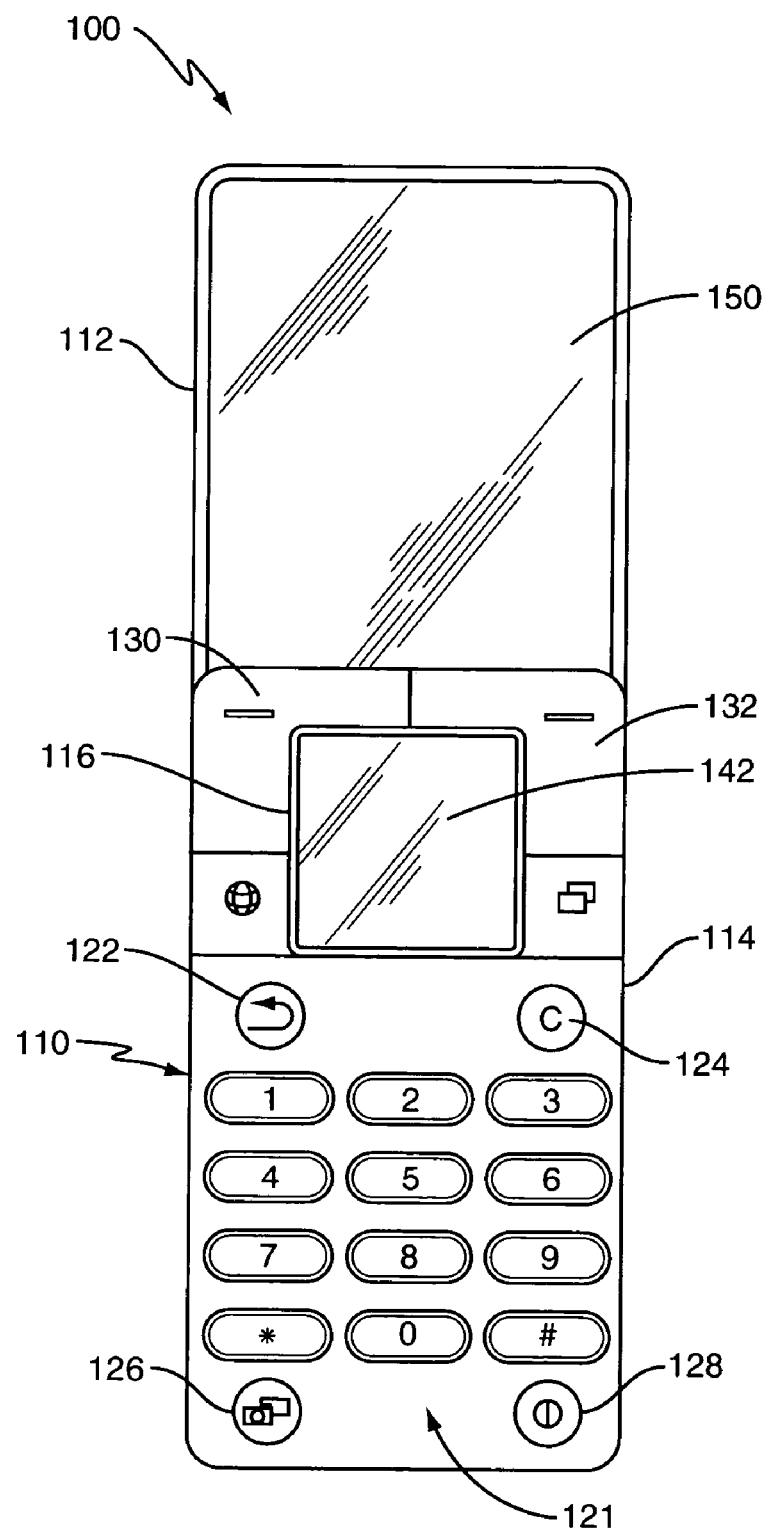
FIG. 5 is a front view of a second exemplary embodiment of the mobile communication device in an open configuration. In this embodiment, a touch pad accessible through the window in the second housing section serves as a touch-sensitive input device.

Referring now to the drawings, a portable electronic device according to one exemplary embodiment of the present invention is shown therein. The exemplary embodiment comprises a mobile communication device 100, such as a mobile phone or personal digital assistant. Those skilled in the art will appreciate, however, that the invention has broad application in a wide range of portable and hand-held electronic devices including audio and video players, audio and video recording devices, cameras, and gaming devices.

The mobile communication device 100 includes a housing 110 comprised of two separate housing sections 112 and 114. The first and second housing sections 112, 114 are slidably connected to one another and slide relative to one another between open and closed positions.

The first housing section 112, referred to herein as the bottom section, includes a display 150. Display 150 may comprise a conventional liquid crystal display or touch-screen display. The second housing section 114, referred to herein as the top section, has a window 116 formed therein. The second housing section 114 substantially covers display 150 in a closed configuration, while leaving a portion thereof visible through the window 116.

The mobile communication device 100 includes one or more input devices indicated generally by the numeral 120. A touch sensitive user input device 140 is arranged in the first housing section 112 such that it is accessible through the window 116 in an open configuration as seen in FIGS. 3 and 5. In the embodiment shown in FIG. 3, display 150 comprises a touch screen display and functions as the touch sensitive input device 140. In the embodiment shown in FIG. 5, the touch sensitive input device 140 comprises a touch pad 142 or other touch input device.

A conventional telephone keypad 121 is disposed on the second housing section 114 below window 116 with several function keys 122, 124, 126, 128. Additionally, two soft keys 130, 132 are disposed adjacent the window 116. The soft keys 130, 132 change function depending on the current context or mode of operation. Soft keys are typically disposed adjacent to a display 150. The function of the soft keys 130, 132 for the current context is indicated by icons or text on the adjacent display 150.

FIGS. 1 and 2 illustrate the mobile communication device 100 in a closed configuration. A portion of display 150 is visible through window 116 in the top housing section 114 and may be used to display information to the user, such as the current time, batter power, and signal strength. In FIG. 1, display 150 contains a message indicating to the user that there is an incoming call and displays caller identification information. Soft key icons are displayed adjacent the soft keys 130 and 132 indicating that the user can press soft key 130 to accept the call and press soft key 132 to reject the call. The soft key icons may comprise text, graphics, or a combination of text and graphics. Icons in the lower part of the window 116 indicate the current battery power level and signal level.

FIGS. 3 and 4 illustrate a first exemplary embodiment of the mobile communication device 100 in an open configuration having a touch-screen display 150. The bottom section 112 has been slid upward relative to the top section 114 to expose a much larger area of the display 150. In this embodiment, top section 114 overlaps a portion of the touch-screen display 150 in the open configuration. The portion of the touch-screen display 150 visible through window 116 in the top section 114 serves as an touch sensitive input. In the embodiment shown in FIG. 3, the portion of the touch-screen display 150 display visible through window 116 becomes a virtual five-way navigation control that can be used to move an on screen cursor or pointer on the display 150, to navigate through menus and items on the display 150, and to make selections.

FIG. 5 illustrates a second embodiment of mobile communication device 100 in an open configuration. In this embodiment, the entire display 150 is raised above the top end of the top section 114. In this case, a touchpad 142 or other input control on the bottom section 112 is accessible through window 116 in the top housing section 114 in the open configuration. Touch pad 142 is covered or concealed in the closed configuration.

Figure 6:
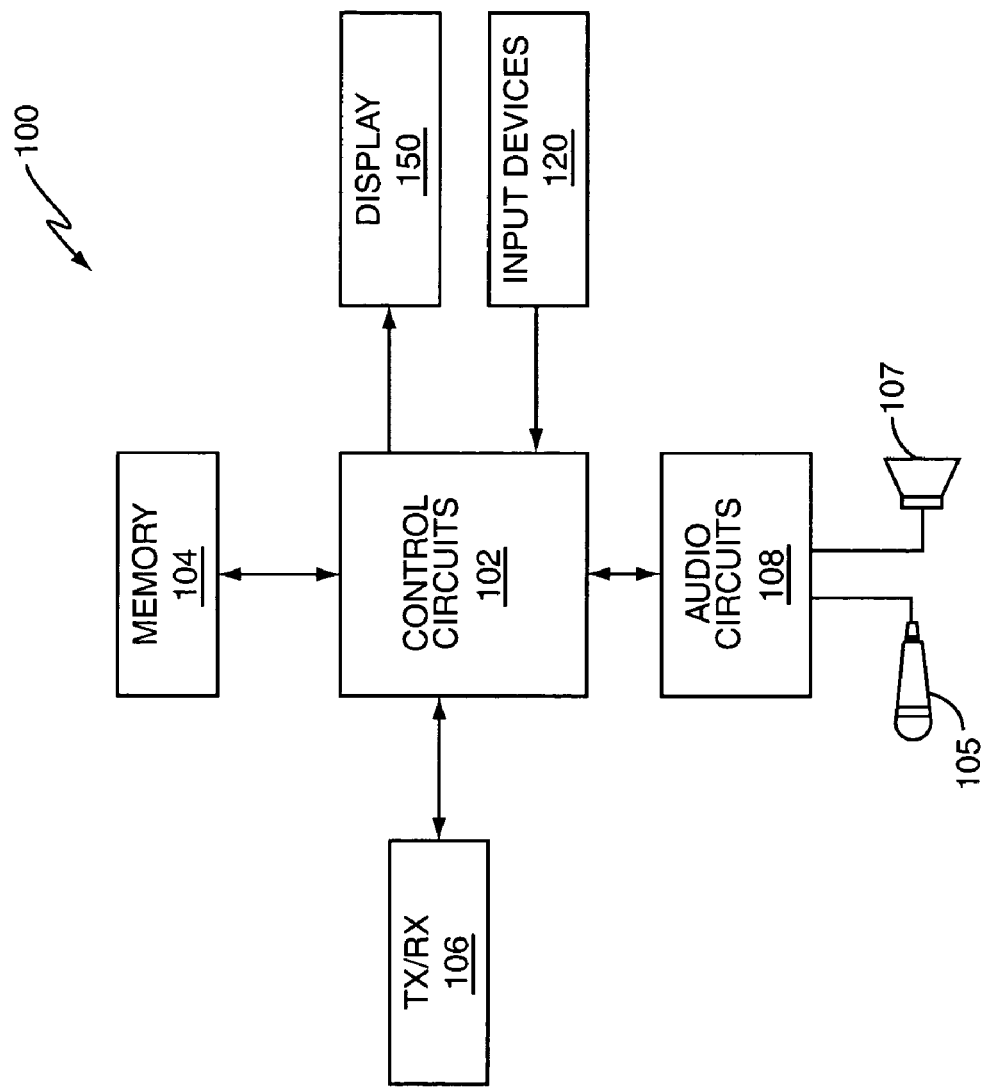
FIG. 6 is a functional block diagram of the mobile communication device.

FIG. 6 illustrates in block diagram form the functional elements of mobile communication device 100. The functional elements include control circuits 102, memory 104, transceiver 106, audio processing circuits 108, and a user interface. Control circuits 102 may comprise one or more processors that control the overall operation of the mobile communication device 100 according to program instructions stored in memory 104. Memory 104 may comprise one or more memory devices, including random access memory for temporary storage and read only memory for permanent storage. Memory 104 stores program instructions and data needed for operation. Transceiver 106 enables communication with remote devices. Transceiver 106 may, for example, comprise a standard cellular transceiver or a short-range wireless interface, such as a BLUETOOTH or WIFI transceiver. Audio processing circuits 108 process audio signals input via microphone 105 and output via speaker 107. Microphone 105 converts acoustic signals to electrical audio signals. Speaker 107 converts electrical audio signals into acoustic signals. A user interface, comprising the display 150 and one or more input devices indicated generally by numeral 120, enable the user to interact with mobile communication device 100. In the embodiments discussed above, the input devices 120 include the keypad 121, function keys 122, 124, 126 and 128, and soft keys 130, 132. The touch sensitive input 140 also functions as a user input device 120.

Control circuits 102 are configured or programmed to vary the display 150 depending on whether the mobile communication device 100 is in the open or closed configuration. In the closed configuration, control circuits 102 cause relevant information to be displayed on the portion of the display 150 that is visible through the window 116 in second housing section 114. For example, for the embodiment shown in FIG. 3, the control circuits 102 cause a virtual 5-way navigation control to be displayed in the portion of the display 150 that is visible through the window 116 in the second housing section 114 and generates navigation control signals responsive to touch input.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A portable electronic device comprising:
    a first housing section;
    a second housing section slidably connected to the first housing section;
    said first and second housing sections being slidable relative to one another between open and closed positions;
    a touch screen display disposed on the first housing section and arranged to be substantially concealed by the second housing section when the first and second housing sections are in the closed position and to be exposed when the first and second housing sections are in the open position; and
    a window in the second housing section allowing a portion of the touch screen display to be viewed through said window when the first and second housing sections are in the open and closed positions; and
    a control circuit operative to output a virtual navigation control to the portion of the touch screen display accessible through said window when the first and second housing sections are in the open position.

2. A portable device comprising:
    a first housing section;
    a second housing section connected to the first housing section and movable relative to the first housing second between open and closed positions;
    a display disposed on the first housing section and arranged to be substantially concealed by the second housing section when the first and second housing sections are in the closed position and to be exposed when the first and second housing sections are in the open position;
    a window in the second housing section allowing a portion of the display to be viewed through said window when the first and second housing sections are in the closed position;
    one or more soft keys disposed on the second housing section adjacent said window; and
    a control unit operative to output soft key icons indicating the functions of said soft keys to the portion of said display that is viewable through said window when the first and second housing sections are in the closed position.

3. The portable electronic device of claim 2 wherein the first housing section includes a touch sensitive input device that is accessible through said window in said second housing section when the first and second housing sections are in the open position.

4. The portable electronic device of claim 3 wherein said touch sensitive input device comprises a touch pad accessible through said window in said second housing section when said first and second housing sections are in the open position.

5. The portable electronic device of claim 3 wherein said display comprises a touch screen display, and wherein said touch sensitive input device comprises a portion of said display accessible through aid window in said second housing section when said first and second housing sections are in the open position.

6. The portable electronic device of claim 5 wherein aid portion of said touch screen display visible through said window when said first and second housing sections are in the open position functions as a navigation control.

7. A portable electronic device comprising:
a first housing section;
a second housing section slidably connected to the first housing section;
said first and second housing sections being slidable relative to one another between open and closed positions;
a display disposed on the first housing section and arranged to be substantially concealed by the second housing section when the first and second housing sections are in the closed position and to be exposed when the first and second housing sections are in the open position;
a window in the second housing section allowing a portion of the display to be viewed through said window when the first and second housing sections are in the closed position; and
a touch pad positioned on said first housing section such that said touch pad is concealed when the first and second housing sections are in the closed position and is accessible through said window in said first housing section when the first and second housing sections are in the open position.

8. A method of arranging user interface elements on a portable electronic device, said method comprising:
slidably connecting first and second housing sections so as to be movable relative to one another between open and closed positions;
arranging a display on said first housing section such that the display is at least partially covered by a second housing section in the closed position; and
forming a window in said second housing section for viewing a portion of said display in both said open and closed positions.

9. The method of claim 8 further comprising arranging a touch sensitive input device on said first housing section such that said touch sensitive input device is accessible through said window in said second housing section in the open position.

10. The method of claim 9 wherein arranging a touch sensitive input device on said first housing section comprises arranging a touch pad such that the touch pad is accessible through said window in said second housing section in the open position.

11. The method of claim 9 wherein arranging a touch sensitive input device on said first housing section comprises arranging a touch screen display such that a portion of the touch screen display is accessible through said window in the open position.

12. The method of claim 11 further comprising displaying a navigation control on said portion of said touch screen display and generating navigation control signals responsive to touch input by the user.

13. The method of claim 8 further comprising arranging one or more soft keys on the second housing section adjacent said window, and displaying soft key icons indicating the function of said soft keys on the portion of said display visible through said window.

* * * * *

UNITED STATES PATENT AND TRADEMARK OFFICE
CERTIFICATE OF CORRECTION

PATENT NO. : 7,493,151 B2
APPLICATION NO. : 11/374687
DATED : February 17, 2009
INVENTOR(S) : Collins It is certified that error appears in the above-identified patent and that said Letters Patent is hereby corrected as shown below:

In column 4, line 53, change "first housing second" to -- first housing section --

In column 5, line 16, change "aid" to -- said --

In column 5, line 19, change "aid" to -- said --

Signed and Sealed this

Twenty-first Day of April, 2009

JOHN DOLL
*Acting Director of the United States Patent and Trademark Office*